(12) United States Patent
Spencer et al.

(10) Patent No.: US 6,214,057 B1
(45) Date of Patent: Apr. 10, 2001

(54) OVERLOAD PROTECTION DEVICE FOR ROBOTIC TOOLING

(75) Inventors: Graham T. Spencer, Troy; Michael P. Gardner, Lewisburg; Beth Van Haaren, New Carlisle, all of OH (US)

(73) Assignee: Process Equipment Co. of Tipp City, Tipp City, OH (US)

( * ) Notice: Subject to any disclaimer, the term of this patent is extended or adjusted under 35 U.S.C. 154(b) by 0 days.

(21) Appl. No.: 09/307,528

(22) Filed: May 7, 1999

(51) Int. Cl.$^7$ ............................. B25J 19/00; F16D 1/00; F16D 3/00
(52) U.S. Cl. ............................. 901/49; 403/13; 403/31; 403/41; 403/24; 403/322.1; 74/490.01; 200/61.41; 318/563; 188/151 R; 901/11; 414/735
(58) Field of Search .................................. 403/31, 41, 24, 403/322.1; 414/735; 901/49, 29

(56) References Cited

U.S. PATENT DOCUMENTS

| | | | |
|---|---|---|---|
| 3,055,227 | * | 9/1962 | Martin .................................. 74/97.1 |
| 4,540,331 | * | 9/1985 | Stanner et al. . |
| 4,639,184 | * | 1/1987 | Knasel et al. ........................ 901/49 X |
| 4,700,932 | * | 10/1987 | Katsuno .............................. 901/49 X |
| 4,714,865 | * | 12/1987 | Chin et al. .......................... 901/49 X |
| 4,786,769 | * | 11/1988 | Knasel et al. ....................... 901/49 X |
| 4,797,564 | * | 1/1989 | Ramunas ............................. 901/49 X |
| 4,842,114 | * | 6/1989 | Hepp . |
| 4,860,864 | * | 8/1989 | Cwycyshyn et al. ............... 901/49 X |
| 4,954,005 | * | 9/1990 | Knasel et al. . |
| 4,998,606 | * | 3/1991 | McCormick et al. ............. 901/46 X |
| 5,086,901 | * | 2/1992 | Petronis et al. .................... 901/49 X |
| 5,558,182 | * | 9/1996 | De la Fuente et al. ............. 188/677 |
| 5,626,216 | * | 5/1997 | Sperling et al. .................... 901/49 X |
| 5,678,944 | * | 10/1997 | Slocum et al. ................... 403/291 X |
| 5,915,506 | * | 6/1999 | Farina ................................. 901/49 X |
| 5,964,124 | * | 10/1999 | Nunes et al. ....................... 403/15 X |
| 6,069,415 | * | 5/2000 | Little et al. ........................ 901/11 X |

FOREIGN PATENT DOCUMENTS

2189458 * 10/1987 (GB) .

* cited by examiner

*Primary Examiner*—Lynne H. Browne
*Assistant Examiner*—Ernesto Garcia
(74) *Attorney, Agent, or Firm*—Jacox, Meckstroth & Jenkins

(57) ABSTRACT

An overload protection device includes a cup-shaped cap member defining a cavity receiving a cup-shaped yoke member defining a pressurized air chamber receiving a piston having a rounded end surface engaging the cap member. An annular cam member is inserted into the cap member and defines three angularly spaced V-shaped cam surfaces with center seats which receive corresponding steel balls mounted on outwardly projecting ears of the yoke member. A rigid plastic ring is mounted on the yoke member with epoxy and contacts an annular shoulder within the cam member. The yoke member carries a pair of axially adjustable and normally closed electrical contact elements which are opened by an actuator pin projecting from the piston in response to tilting and/or rotation and/or axial movement between the yoke member and cap member.

17 Claims, 3 Drawing Sheets

OVERLOAD PROTECTION DEVICE FOR ROBOTIC TOOLING

BACKGROUND OF THE INVENTION

This invention relates to overload protection or safety coupling devices for robotic tooling and of the general type disclosed in U.S. Pat. No. 4,954,005 which issued to the assignee of the present invention, and also as disclosed in U.S. Pat. No. 4,842,114 and No. 4,540,331. Such a safety or protection device is used between the end of an arm of a robot and the tooling carried by the arm and provides for opening an electrical control circuit to the shut down of the robot in the event the predetermined movement of the tooling by the robotic arm is accidentally blocked by an obstruction or by non-compliant movement of the robot arm due to a malfunction of the robot.

With any such safety or protection device, it is desirable for the device to operate and open the control circuit quickly in the event there is any rotational and/or tilting and/or axial movement of the tooling relative to the end of the robot arm. It is also desirable for the device to reset automatically with high return accuracy after the blockage is removed or the reason for the relative movement between the arm and the tooling is corrected. It has also been found desirable for the device to be compact with a low profile and have a high load capacity so that the robot arm may quickly move tooling having substantial size and weight or mass. While the safety or protection devices disclosed in the above patents provide some of the above desirable features, the devices have limitations which prevent the devices from providing all of the desirable features.

SUMMARY OF THE INVENTION

The present invention is directed to an improved overload safety or protection device which provides all of the desirable features mentioned above and which may also be efficiently manufactured. The protection device of the invention may also be conveniently adjusted for precisely selecting pre-trip compliance or the small degree of relative movement between the robot arm and the tooling before the electrical circuit opens and the robot shuts down.

In accordance with a preferred construction of the safety or protection device of the invention, a cup-shaped cap member defines a cavity which receives a smaller and opposing cup-shaped yoke member having three angularly spaced ears projecting outwardly into portions of the cavity. The yoke member defines a fluid chamber which receives a piston having a rounded end surface engaging the cap member. A set of three chrome steel balls are secured to the ears of the yoke member, and an annular cam member is inserted into and secured to the cap member. The cam member has three angularly spaced V-shaped cam surfaces with V-shaped center seats normally engaged by the steel balls. A plastic ring is carried by the yoke member and contacts a shoulder within the cam member. A switch base is adjustably positioned within the yoke member and carries a pair of normally closed spring metal electrical contact elements. An actuator pin is carried by a center portion of the piston and is effective to separate and open the contact elements in response to either tilting and/or rotational and/or axial movement between the cap and yoke members.

Other features and advantages of the invention will be apparent from the following description, the accompanying drawings and the appended claims.

DESCRIPTION OF THE PREFERRED EMBODIMENT

Figure 1:
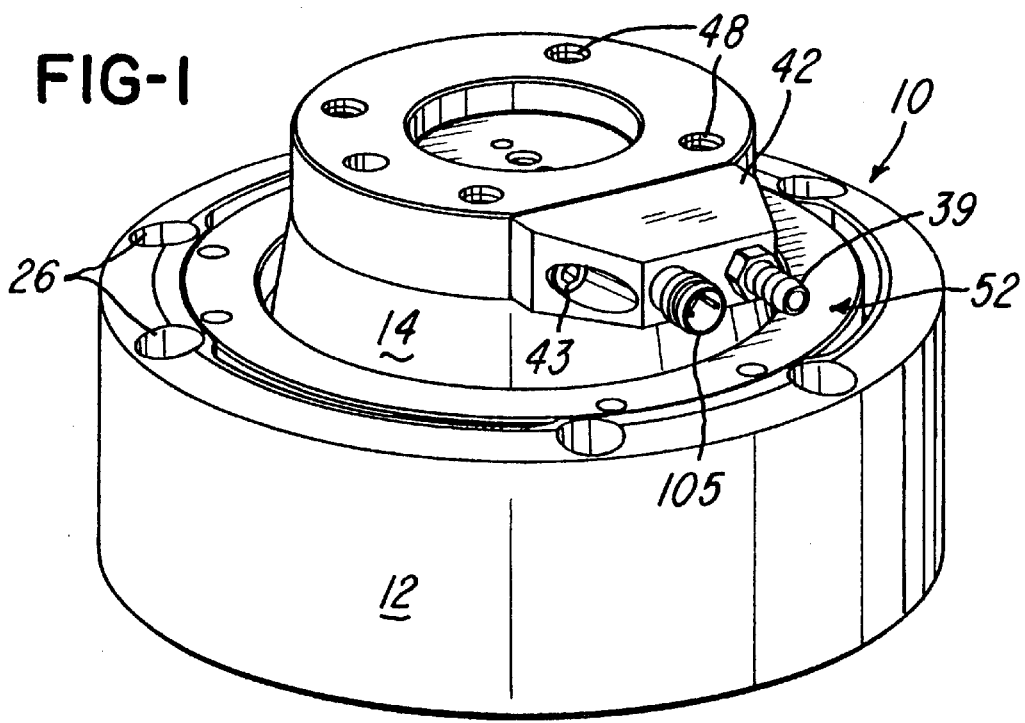
FIG. 1 is a perspective view of an overload protection device constructed in accordance with the invention.

FIG. 1 illustrates an overload protection or safety device 10 constructed in accordance with the invention and adapted for use as a compact coupler between the end of a robotic arm and the tooling carried by the arm. The tooling is connected to an aluminum cup-shaped cylindrical cap member 12, and the end of the robotic arm is connected to an opposing cup-shaped aluminum yoke member 14. The cap member defines a cavity 17 having three angularly spaced recesses 19 (FIG. 3), and the end wall of the cap member 12 has a flat inner surface 21 and has three angularly spaced step portions 23 located between the cavity recesses 19. A series of six holes 26 extend through the cap member 12 in an axial direction and are used for receiving bolts which secure the cap member to the robotic tooling.

The yoke member 14 defines a cylindrical fluid or air chamber 29 which receives a cylindrical piston 32 formed of a rigid plastics material. The piston 32 has a rounded or part-spherical end surface 34 which engages the flat inner surface 21 of the cap member 12. The piston 32 is movable axially within the chamber 29 which receives a pressurized fluid or regulated air through a passage 36 connected to a pressurized air supply fitting 39 (FIG. 1). The fitting 39 is threaded into a molded plastic connector block 42 secured to an end portion of the yoke member 14 by a pair of screws 43. A resilient or rubber sealing ring 46 is confined within a peripheral groove 47 in the piston 32 and forms a substantially fluid tight sliding seal between the piston 32 and the yoke member 14. Threaded holes 48 are used for attachment of the yoke member 14 to the robot arm.

Figure 2:
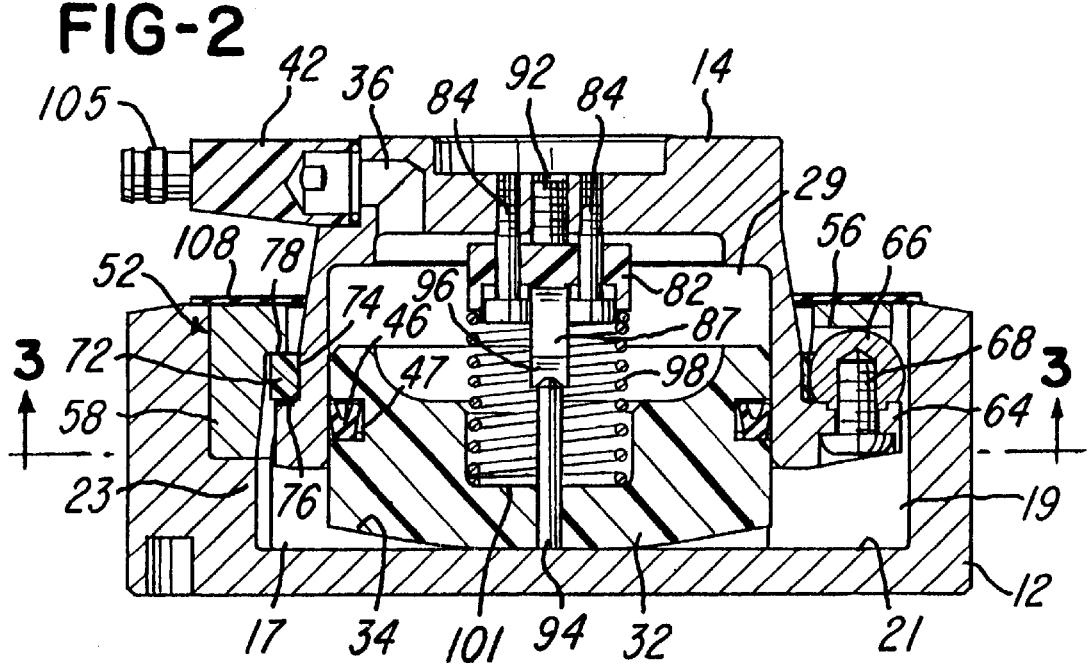
FIG. 2 is an axial section of the protection device shown in FIG. 1 and taken generally on the line 2—2 of FIG. 3.
Figure 5:
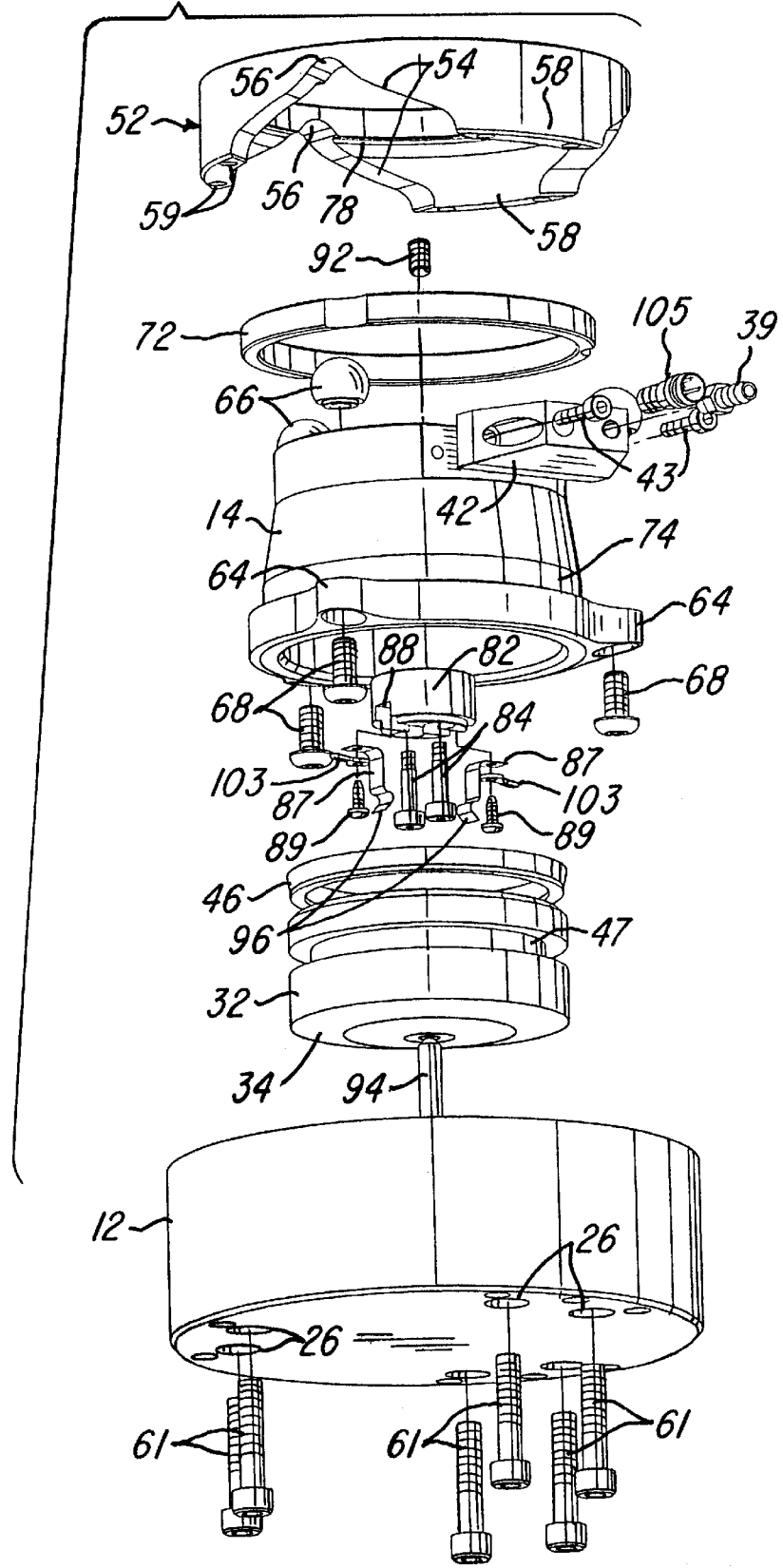
FIG. 5 is an exploded perspective view of the device shown in FIGS. 1–4 and illustrating the assembly of internal components.

Referring to FIGS. 2 and 5, an annular steel insert or cam member 52 has three angularly spaced and inverted V-shaped cam surfaces 54 each having a V-shaped two point center seat 56. Between the cam surfaces 54 of the cam member 52 are arcuate bosses 58 each of which has two threaded holes 59. The bosses 58 seat on the step portions 23 of the cap member 12, and the cam member 52 is secured to the cap member by a set of six cap screws 61 (FIG. 5) which extend through counter bored holes within the cap member 12 and into the threaded holes 59.

Figure 3:
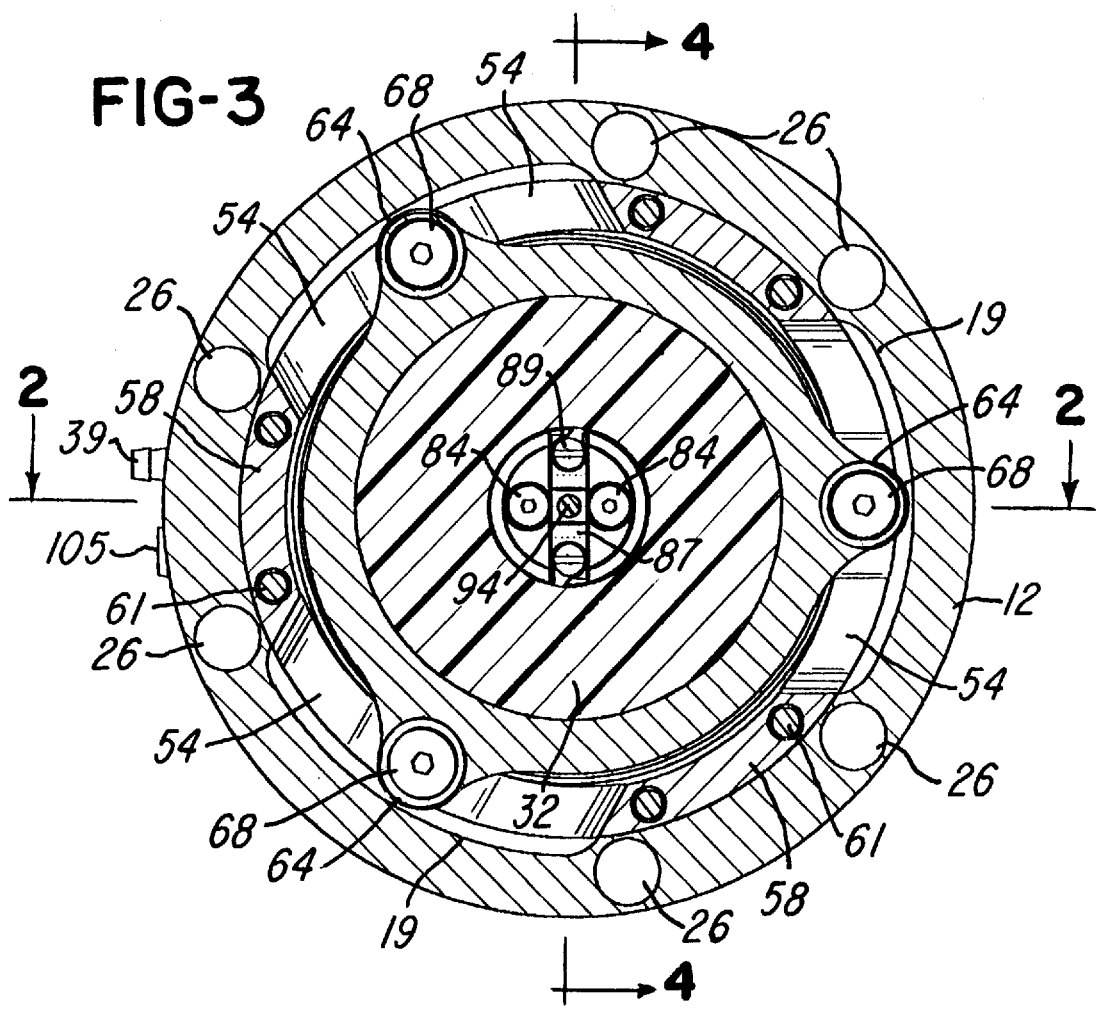
FIG. 3 is a radial section of the device, taken generally on the line 3—3 of FIG. 2.

As shown in FIGS. 3 and 5, the inner end portion of the yoke member 14 has three angularly spaced ears 64 which project outwardly into the corresponding arcuate recesses 19 of the cavity 17. A hardened chrome plated steel ball 66 (FIG. 2) is secured to each ear 64 by a screw 68, and the balls 66 normally engage with point contact the corresponding seats 56 within the cam member 52 when pressurized air is supplied to the chamber 29 for biasing the piston 32 downwardly (FIG. 2) against the cap member 12 and the yoke member 14 upwardly. A rigid plastic ring 72 (FIGS. 2, 4 & 5) is retained on an annular step surface 74 formed on the yoke member 14 and is retained by a ring of epoxy cement or adhesive 76. The ring 72 contacts a shoulder or seat 78 within the cam member 52 when the three balls 66 engage the corresponding seats 56. The plastic ring 72 and the uncured pliable epoxy cement 76 are placed on the surface 74 after which the cam member 52 is installed and the chamber 29 is pressurized to press the balls 66 against the seats 56. This causes the epoxy filler 76 to be compressed before it cures and hardens so that the ring 72 only contacts the shoulder 78 and does not interfere with the seating of the three balls 66 on the corresponding seats 56.

A plastic switch block or base 82 is supported for axial movement within the chamber 29 of the yoke member 14 by a pair of guide screws 84 threaded into the yoke member. The base 82 carries a pair of spring metal switch contact elements 87 (FIGS. 2 & 4) which are retained within a channel 88 of the base 82 by a pair of screws 89. An adjustment set screw 92 is threaded into a center portion of the yoke member 14 and engages the switch base 82, and a dielectric or phenolic actuator pin 94 is secured to a center portion of the piston 32 in axial alignment with the screw 92. The pin 94 has a tapered upper end surface (FIG. 2) which normally engages or is slightly spaced from the tapered end flanges 96 of the spring metal switch contact elements 87. A compression spring 98 is confined within a cavity 101 within the piston 32 and engages a shoulder on the switch base 82 for normally biasing the switch base and the contact elements 87 against the adjustment screw 92.

Electrical conductors (not shown) extend from terminals 103 attached to the contact elements 87 to corresponding terminals within an electrical fitting 105 (FIG. 1) within the connector block 42. An optional dust cover 108 (FIGS. 2 & 4) in the form of a flat rubber ring, is mounted on the yoke member 14 and contacts the upper surfaces of the cam member 52 and cap member 12.

In operation of the overload protection device 10, the electrical contact elements 87 are normally closed when the chamber 29 is pressurized with air and the balls 66 are urged against the V-shaped seats 56. If the cap member 12 is moved axially toward the yoke member 14, the actuator pin 94 separates the contact elements 87 so that the circuit opens which sends a signal to the controller. In the event the cap member 12 is rotated in either direction relative to the yoke member 14, the balls 66 move from their corresponding seats 56 up the corresponding cam surfaces 54, causing the actuator pin 94 to separate the contact elements 87 and open the circuit. Similarly, if the cap member 12 is tilted in any direction, the yoke member 14 pivots on the ring 72 causing the piston 32 to move into the chamber 29 and the actuator pin to separate the contact elements 87 and open the circuit. It is thus apparent that any relative or universal movement between the cap member 12 and the yoke member 14, whether axially or rotational or tilting, or any combination of these movements, causes the actuator pin 94 to separate the contact elements 87 and open the circuit.

Figure 4:
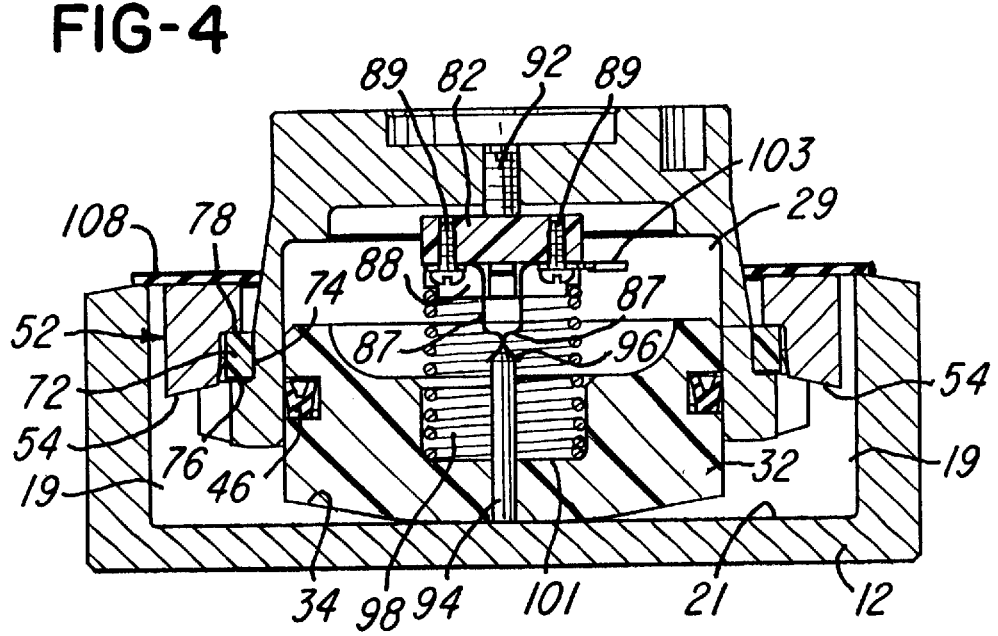
FIG. 4 is an axial section similar to FIG. 2 and taken generally on the line 4—4 of FIG. 3.

From the drawings and the above description, it is apparent that an overload protection device constructed in accordance with the invention, provides desirable features and advantages. As one important advantage, the three balls 66 and the two point contact of each ball with its corresponding V-shaped seat 56 provide for high return accuracy when the cap member 12 and yoke member 14 return to their normal positions as shown in FIGS. 2 & 4. The protection device also provides for automatic reset after removal of the force which produced movement of the cap member 12 relative to the yoke member 14 as a result of air pressure within the chamber 29. The device 10 also is compact after assembly and is capable of carrying a substantial load or tooling having a substantial size or mass. The structure of the protection device 10 also minimizes the overall axial length of the device so that the device has a low profile and minimizes the distance between the end of the robot arm and the tooling. The components of the device 10 are also economical to manufacture and assemble and provide the precision device with a highly dependable and extended service life.

While the form of apparatus or protection device herein described constitutes a preferred embodiment of the invention, it is to be understood that the invention is not limited to this precise form of device, and that changes may be made therein without departing from the scope and spirit of the invention as defined in the appended claims.

What is claimed is:

1. An overload protection device adapted to be mounted on a robot arm to support tooling, said device comprising a cap member defining a cavity, a yoke member projecting into said cavity of said cap member and defining a fluid chamber, a piston supported for axial movement within said chamber and confined in said chamber by said cap member, a plurality of angularly spaced contact elements having substantially part-spherical surfaces and supported by said yoke member, an annular cam member surrounding said yoke member and secured to said cap member, said cam member having a corresponding plurality of angularly spaced generally V-shaped cam surfaces and seats engaging said surfaces of said contact elements, means for directing pressurized fluid to said chamber between said piston and said yoke member to bias said contact elements against corresponding said seats, said contact elements, said piston and said cam surfaces providing for axial, tilting and rotational movement between said yoke member and said cap member, said yoke member having a corresponding plurality of ears projecting radially outwardly into portions of said cavity between said cap member and said cam member, a corresponding plurality of screws extending through said ears and into said contact elements, and a circuit control positioned to sense relative movement between said yoke member and said cap member.

2. A device as defined in claim 1 wherein said ring member comprises a ring of rigid plastics material secured to said yoke member by a cured adhesive.

3. A device as defined in claim 1 wherein said circuit control comprise relatively movable and normally closed switch contact elements, and an actuator carried by said piston for separating said contact elements in response to axial movement of said piston within said chamber.

4. A device as defined in claim 3 wherein said switch contact elements comprise a set of flexible metal contact elements having portions adjacent said actuator, and means for adjusting said contact elements relative to said actuator.

5. A device as defined in claim 3 and including an adjustment screw within a center portion of said yoke member and providing for moving said contact elements relative to said actuator for precisely selecting the degree of relative movement between said yoke member and cap member for opening said contact elements.

6. A device as defined in claim 1 wherein said piston has a rounded end surface engaging said cap member within said cavity and providing for tilting movement of said cap member relative to said yoke member and said piston.

7. An overload protection device adapted to be mounted on a robot arm to support tooling, said device comprising a cap member defining a cavity, a yoke member projecting into said cavity of said cap member and defining a fluid chamber, a piston supported for axial movement within said chamber and confined in said chamber by said cap member, a plurality of angularly spaced contact elements, an annular cam member surrounding said yoke member and secured to said cap member, said cam member having a corresponding plurality of angularly spaced contoured cam surfaces and seats engaging said contact elements, a ring member mounted on an external shoulder of said yoke member and contacting a shoulder surface within said annular cam member between said contact elements at substantially a plane defined by said seats to produce a substantially uniform tilting force around said yoke member, means for directing pressurized fluid to said chamber between said piston and said yoke member to bias said contact elements against corresponding said seats, said contact elements, said piston and said cam surfaces providing for axial, tilting and rotational movement between said yoke member and said cap member, and a circuit control positioned to sense relative movement between said yoke member and said cap member.

8. An overload protection device adapted to be mounted on a robot arm to support tooling, said device comprising a cap member defining a cavity, a yoke member including an annular portion projecting into said cavity of said cap member and defining a fluid chamber, a piston supported for axial movement within said chamber and confined in said chamber by said cap member, three angularly spaced contact balls secured to said yoke member and positioned radially outwardly within said cavity from said annular portion defining said chamber, an annular cam member surrounding said annular portion of said yoke member and secured to said cap member in axial overlying relation to said contact balls, said annular cam member having three angularly spaced pairs of V-shaped cam surfaces with each said pair of cam surfaces converging to a V-shaped seat for the corresponding said contact ball, each of said V-shaped cam surfaces extending circumferentially in opposite directions from the corresponding said V-shaped seat by a distance greater than the diameter of the corresponding said ball, a passage within said yoke member for directing pressurized fluid to said chamber between said piston and said yoke member to bias said contact balls against the corresponding said seats, said contact balls, said piston and said cam surfaces providing for axial, tilting and rotational movement between said yoke member and said cap member against the force of said piston, said contact balls sliding up the corresponding said cam surfaces against said bias of the piston in response to rotation between said yoke member and said cap member, and a circuit control positioned to sense relative movement between said yoke member and said cap member.

9. A device as defined in claim 8 wherein said contact balls each has a rounded surface with a two point contact with the corresponding said V-shaped seat, and each said pair of V-shaped cam surfaces define an included angle greater than an included angle defined by the corresponding said V-shaped seat.

10. A device as defined in claim 8 wherein said piston comprises a rigid plastic material.

11. A device as defined in claim 8 and including a ring member mounted on said yoke member and positioned to contact a shoulder surface within said annular cam member.

12. A device as defined in claim 11 wherein said ring member comprises a ring of rigid material secured to said yoke member by a cured adhesive.

13. A device as defined in claim 8 wherein said circuit control comprises relatively movable and normally closed switch contact elements in opposing relation, and a non-conductive actuator pin carried by said piston for separating said contact elements in response to axial movement of said piston within said chamber.

14. A device as defined in claim 13 wherein said switch contact elements comprise a pair of flexible metal contact elements having tapered portions adjacent said actuator pin, and means for adjusting said contact elements axially relative to said actuator pin.

15. A device as defined in claim 13 and including a support base of plastic material and supporting said switch contact elements, an adjustment screw carried by said yoke member and forming a stop for said support base, and a compression spring carried by said piston and biasing said support base against said adjustment screw.

16. A device as defined in claim 8 wherein said piston has a rounded axially facing end surface engaging said cap member within said cavity and providing for tilting movement of said cap member relative to said yoke member and said piston.

17. A device as defined in claim 8 and including an annular and flexible dust cover surrounding said yoke member and covering said annular cam member.

* * * * *